Sept. 16, 1958 E. J. CAVANAUGH 2,852,083
POWER DRIVE FOR LAWN MOWERS
Filed June 24, 1957 4 Sheets-Sheet 1

INVENTOR.
EDWIN J. CAVANAUGH
BY
Mellin and Hanscom
ATTORNEYS

Sept. 16, 1958　　　E. J. CAVANAUGH　　　2,852,083
POWER DRIVE FOR LAWN MOWERS
Filed June 24, 1957　　　　　　　　　　　4 Sheets-Sheet 2
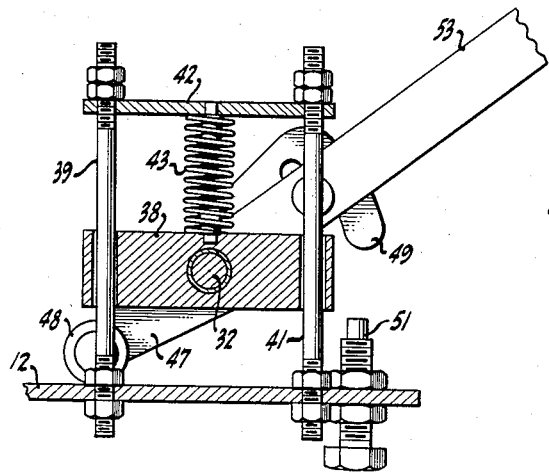
FIG·2
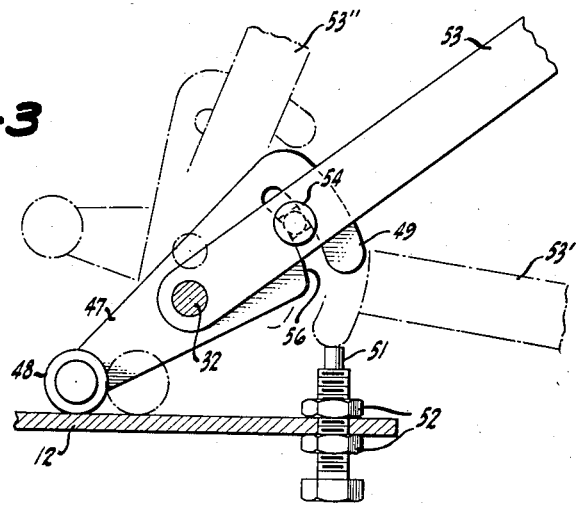
FIG·3
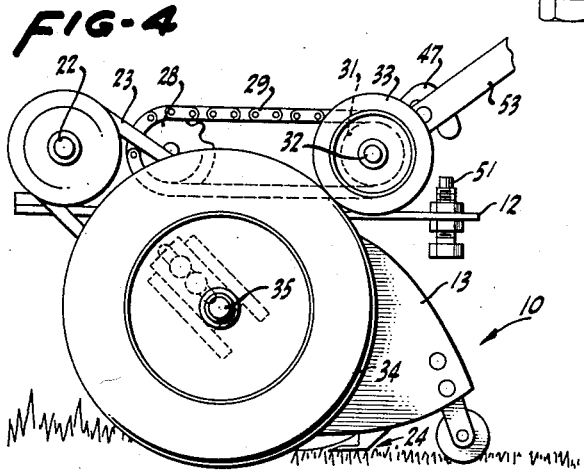
FIG·4
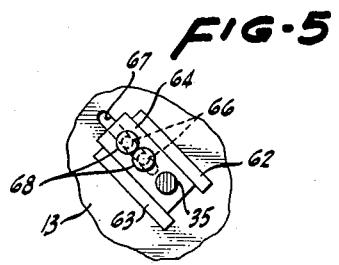
FIG·5
INVENTOR.
EDWIN J. CAVANAUGH
BY
Mellin and Hanscom
ATTORNEYS Sept. 16, 1958 E. J. CAVANAUGH 2,852,083
POWER DRIVE FOR LAWN MOWERS
Filed June 24, 1957 4 Sheets-Sheet 3
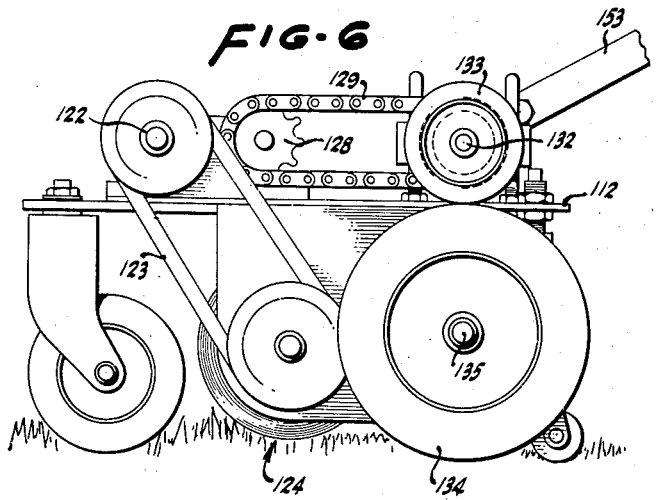
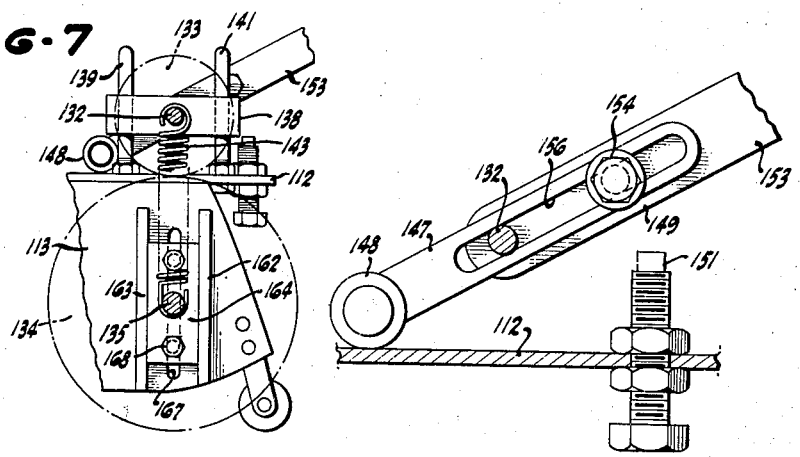
INVENTOR.
EDWIN J. CAVANAUGH
BY
Mellin and Hanscom
ATTORNEYS

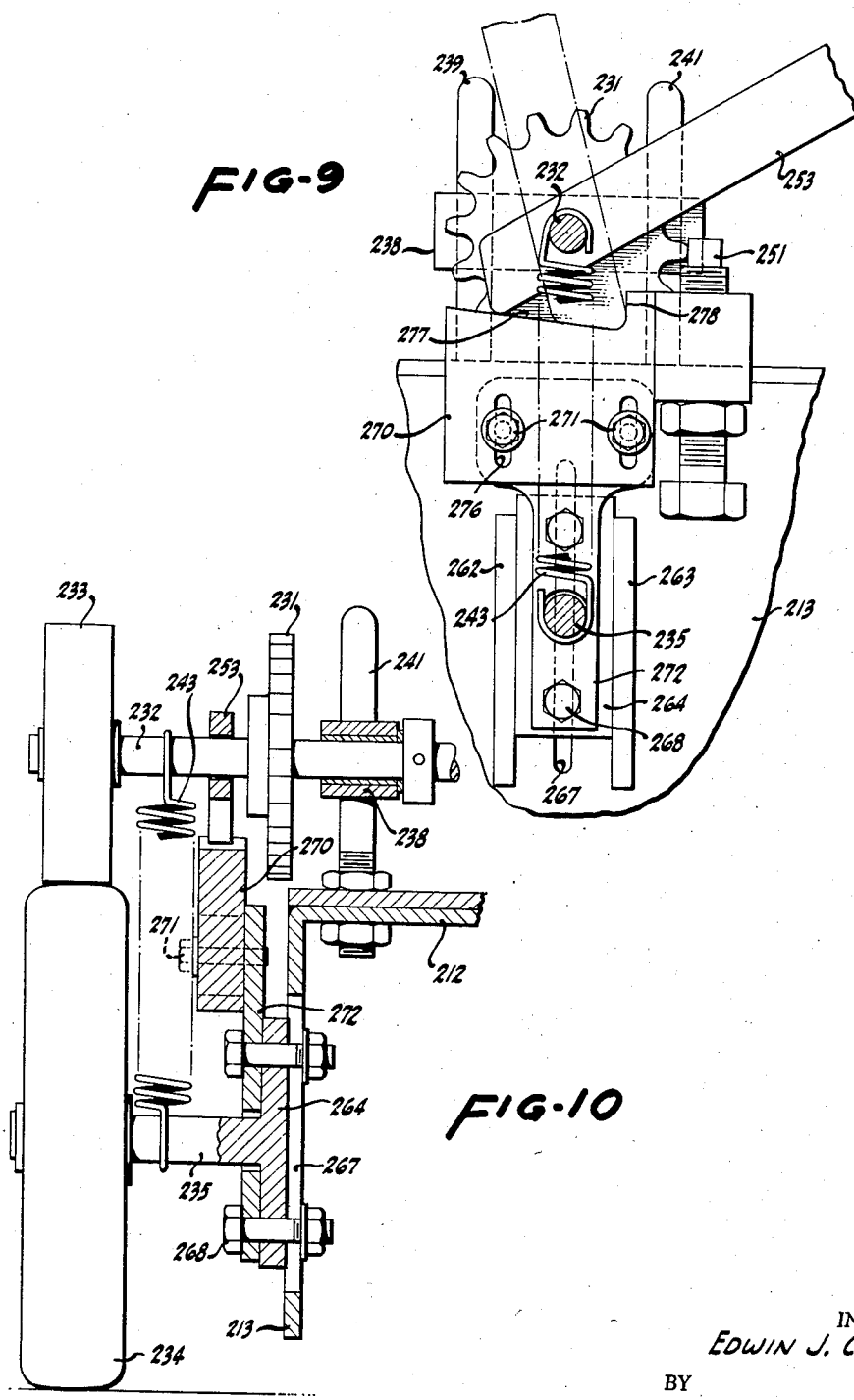

United States Patent Office 2,852,083
Patented Sept. 16, 1958

2,852,083

POWER DRIVE FOR LAWN MOWERS

Edwin J. Cavanaugh, Concord, Calif.

Application June 24, 1957, Serial No. 667,649

10 Claims. (Cl. 180—19)

This invention relates to and has for its primary object the provision of a power drive for a lawn mower, and more particularly a lawn mower in which the cutting reel and ground engaging wheels are separately driven.

The invention herein described is adapted to be used on a lawn mower originally built as a power mower, or to be used to convert an existing manually operable mower into a power driven mower. The invention contemplates the separate powering of the cutting reel and the ground engaging wheels of the mower, as this has been found to be considerably more desirable than power mowers in which the power is applied to the wheels alone, with the cutting reel being geared to the wheels. The power needed to drive the wheels is considerably less when the wheels are separately driven, for when the mower is stopped and it is desired to start, the cutting reel is idling and the only resistance that the power source need overcome is the inertia of the weight of the machine. The invention also provides a drive source for the wheels of the mower in which drive wheels frictionally engage the ground engaging wheels and in which the drive wheels are strongly urged into gripping engagement with the ground wheels when the mower is starting to roll, or when the mower is slowly moving on an uphill slope. In this manner, the tendency of the drive wheels to slip on the ground wheels is overcome. When the mower is operating at normal speed along the ground, the gripping engagement of the drive wheels on the ground wheels is lessened, thus requiring a lesser power to maintain forward progress.

Another important feature of the invention is the manner in which the engagement of the drive wheels with the ground wheels is controlled by the usual manually operable handle of the mower. The handle is adapted to be moved between an upper position, an intermediate position, and a lower position, with disengagement of the drive to the ground wheels occurring at both upper and lower positions of the handle. Thus, if the mower is not being used, the handle will swing by its own weight to the lower position, disengaging the drive. If it is desired to start the engine on the mower, the handle will normally be in its lower position and the engine may be started without the resulting drive being transmitted to the ground wheels. After the engine is running, the mower may be operated by simply lifting up on the handle to engage the drive wheels with the ground wheels. If, in course of operation, the mower should run away from the operator such that he releases the handle, the handle will fall and disengage the drive. Thus, the mower has the safety feature of disengaging the drive when left unattended.

In addition, it is very desirable for the handle to be swung upwardly to disengage the drive. For example, the mower may be cutting a swath towards a building, wall, tree or the like. In such a case, if the only way that the drive could be disengaged were for the handle to be lowered, the mower could only go close enough to the obstruction such that the handle could be lowered and swung around to face the mower in the opposite direction. By the present invention, the drive can be disengaged by simply raising the handle. In this manner the mower can be run right up to the obstacle, the handle being then raised to disengage the drive so that the mower can be rotated adjacent the obstacle, and the mower may then be started off in the new direction. In addition, the separate power drive for the cutter reel makes the mower easily maneuverable in the above situation when the drive to the ground wheels is disengaged.

It is an object of the invention to provide a power drive for a mower in which the freely rotatable ground wheels are driven by drive wheels in tangential frictional engagement therewith, and in which the drive wheels are strongly urged against the ground wheels when the latter are at rest or slowly moving.

A further object of the invention is to provide a power drive for a lawn mower in which the ground wheels are driven by drive wheels in tangential frictional engagement therewith, and in which the drive wheels are disengaged from the ground wheels by moving the operating handle of the mower upwardly or downwardly from its intermediate operative position.

A yet further object is to provide a power drive for a lawn mower in which the ground wheels are driven by drive wheels in tangential frictional engagement therewith, and in which the drive wheels are disengaged from the ground wheels by moving the operating handle of the mower upwardly or downwardly from its intermediate operative position, and in which the height of the cutting reel of the mower may easily be varied by adjusting the height of the mower frame relative to the ground wheels without affecting the operative drive disengaging positions of the handle.

Another object of the invention is to provide a power drive for a lawn mower in which the ground wheels are driven by drive wheels in tangential frictional engagement therewith, and in which the drive wheels are disengaged by moving the operating handle of the mower upwardly or downwardly from its normal intermediate operative position, and in which the upward or downward movement of the handle necessary to cause disengagement of the drive for the ground wheels may be easily and independently varied as desired.

Still another object of the invention is to provide a power drive for a lawn mower in which the ground wheels are driven by drive wheels in frictional engagement therewith, and in which the drive wheels are spring biased towards the ground wheels, and in which the ground wheels may be vertically adjusted relative to said mower without varying the amount of spring bias.

Other objects and advantages will become apparent in the course of the following detailed description.

In the accompanying drawings, forming a part of this application, and in which like numerals are used to designate like parts throughout the same, Fig. 1 is a perspective view of a lawn mower embodying the invention.

Fig. 2 is a fragmental elevational sectional view illustrating the mounting of the drive shaft on the frame of the mower.

Fig. 3 is a fragmental elevational sectional view illustrating the drive disengaging mechanism for the drive shaft.

Fig. 4 is a side elevational view of the lawn mower shown in Fig. 1.

Fig. 5 is a detail of the adjustable mounting of the ground engaging wheel stub shaft on the frame of the mower.

Fig. 6 is a side elevational view illustrating a modification of the invention.

Fig. 7 is a fragmental side elevational view with the drive wheel and ground wheel shown in phantom, illustrating the vertical adjustment of the embodiment of Fig. 6.

Fig. 8 is a fragmental elevational sectional view illustrating the drive disengaging means for the drive shaft of Fig. 6.

Fig. 9 is a view similar to Fig. 7 and illustrating another modification of the invention.

Fig. 10 is a sectional view, in elevation, of the modification shown in Fig. 9.

Figure 1:
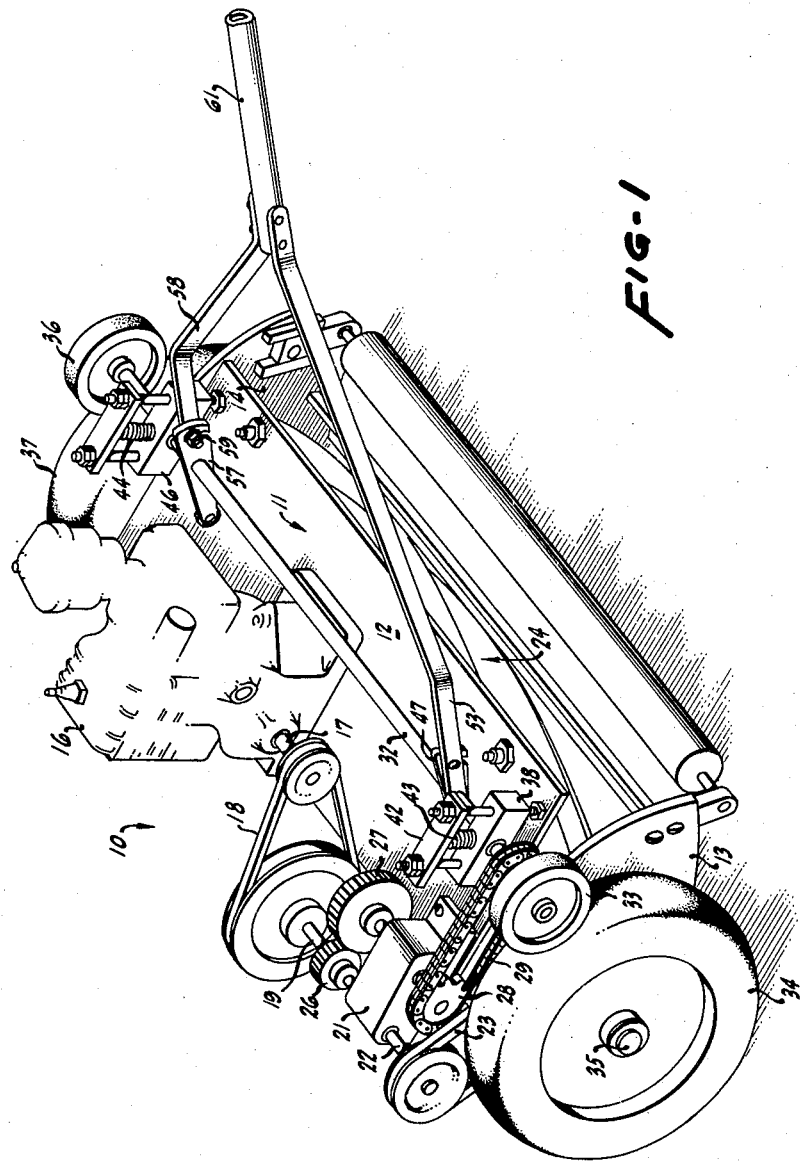

In the drawings, wherein for purposes of illustration are shown preferred embodiments of the invention, and referring now to Figs. 1 through 5, the lawn mower, generally indicated by the reference numeral 10, comprises a frame 11 having a generally flat top member 12 and downwardly extending side members 13 and 14 secured thereto. If desired, the frame members 12, 13 and 14 may be formed as an integral unit, or the top frame member 12 may be fixedly secured to the side members of an existing manually operable lawn mower, if it is desired to convert such mower into a power driven mower.

A conventional gasoline engine 16, secured to frame 11, has a drive shaft 17 to drive belt 18 and shaft 19. The rotation of shaft 19 is coupled through suitable gears (not shown) in gear box 21 to output shaft 22 and thus to drive belt 23. The drive from this belt is connected by conventional means (not shown) to the cutting reel 24 of the mower, so that whenever the engine 16 is operating, the cutting reel 24 will be rotated thereby.

Gear 26, fixed to shaft 19, meshes with gear 27 to transmit the engine drive through suitable gearing in gear box 21 to the drive sprocket 28. Link chain 29 is trained around sprocket 28 and a similar sprocket 31 fixed to shaft 32, so that whenever engine 16 is operating, the shaft 32 will be rotated thereby. Although a link chain as illustrated to transmit the power drive to shaft 32, a rubber V-belt may be used for this purpose, if desired.

A drive wheel 33, fixedly carried at one end of shaft 32, is adapted to be in tangential and frictional engagement with the rear surface of the ground engaging wheel 34 of the mower, the latter being mounted for free rotation on stub shaft 35 fixed to side member 13 of frame 11. The drive wheel 33 and ground engaging wheel 34 are each preferably rubber covered, as by rubber tires, although either, or both, of these wheels may be of other materials, if desired, as long as there is a sufficient frictional engagement therebetween for the drive wheel 33 to cause rotative movement of the wheel 34. In a similar manner, drive wheel 36 secured to the other end of shaft 32 is in tangential frictional engagement with the other ground engaging wheel 37.

The shaft 32 is journaled for rotation in bearing block 38 mounted for vertically reciprocatory movement on bolts 39 and 41 secured at their lower ends to frame member 12. The bolts 39 and 41 are normal to the flights of the link chain 29. A plate 42 carried at the upper end of bolts 39 and 41 anchors one end of compression spring 43, the other end of which bears on the top of bearing block 38 to bias the bearing block and shaft 32 downwardly forcing the drive wheel 33 into normal engagement with the ground engaging wheel 34.

A similar spring 44 bears down on bearing block 46 to force the drive wheel 36 into normal engagement with ground engaging wheel 37.

Drive wheel 33 is disengaged from ground wheel 34 by the following mechanism. A first lever 47 is freely mounted intermediate its ends on shaft 32, and is provided at one end with a roller 48 adapted to engage and roll on the top frame member 12. The other end of lever 47 is provided with a surface 49 adapted to engage adjustment bolt 51 secured to frame member 12 by nuts 52. A second lever 53 is also freely mounted on shaft 32 adjacent to, and clamped to, lever 47 by means of bolt 54. A slot 56 is provided in lever 47 so that the relative angularity between levers 47 and 53 may be varied as desired.

In the same manner, levers 57 and 58 are freely mounted on shaft 32, in adjacency to bearing block 46, with bolt 59 holding them together in a desired angular relation.

The two levers 53 and 58 are bent inwardly at their outer ends and are secured to the lower end of a conventional manually operable handle 61.

The ground engaging wheel 34 is vertically adjustably mounted on side frame member 13 in the following manner. Two parallel guide members 62 and 63 are formed on side frame member 13 to receive the slide member 64 therebetween, the slide member 64 having the stub shaft 35 integral therewith. Bolts 66 extend through slide member 64 and slot 67 formed in frame member 13, with nuts 68 enabling the slide member 64 to be clamped to frame member 13. The slot 67 is angularly disposed with respect to the shaft 32 such that the slot 67 is approximately normal to the line extending between stud shaft 35 and shaft 32. In this manner, the slide 64 may be moved longitudinally and between guides 62 and 63 to adjust the height of the mower 10 from the ground, with the drive wheel 33 remaining in engagement with the rim of the ground engaging wheel 34 without any appreciable variance in the height of the shaft 32 from the top frame member 12. The vertical variance of shaft 32 from frame member 12 may be eliminated entirely as wheel 34 is adjusted vertically with respect to frame member 13, by forming slot 67 on the curve generated by using shaft 32 as a center and with a radius equal to the sum of the radii of wheels 33 and 34. However, the use of a straight slot 67 has been found to allow sufficient vertical variance of the mower 10 from the ground, without a significant vertical variance of shaft 32 from the frame member 12. In this manner, the downward force exerted by spring 43 remains approximately the same as the wheels 34 and 36 are vertically adjusted relative to the frame.

In operation, the handle 61 is sufficiently heavy so as to be usually lowered by its own weight, so that lever 53 will occupy the dotted line position of Fig. 3 shown as 53'. In this position, the combined levers 47 and 53 will function as a first class lever acting on bolt 51 as a fulcrum to elevate the shaft 32 with respect to frame 11. This movement will move the drive wheel 33 away from engagement with the ground engaging wheel 34.

The engine 16 is then started, and power will be applied to the cutting reel 24, and to the drive wheels 33 and 36. The mower may be caused to move forwardly by simply lifting up on the free end of handle 61, which lowers the shaft 32 by the bias of springs 43 and 44 and, consequently, lowers the drive wheels 33 and 36 into frictional engagement with the ground engaging wheels 34 and 37. As shown in Fig. 4, the link chain 29 is positioned so that the lower flight thereof pulls on sprocket 31 to rotate the shaft 32 and drive wheels 33 and 36 and, in addition, causes the drive wheels to pull downwardly onto the ground engaging wheels so that the gripping engagement therebetween is greater than the downward force applied merely by the springs 43 and 44. This may best be explained by considering wheel 34 as non-rotating at the moment. With a force applied to the chain 29, the drive wheel will be urged to roll downwardly on wheel 34, with an increase in pressure therebetween. By this arrangement, the greatest pressure is exerted between drive wheel 33 and wheel 34 and, consequently, the greatest frictional power transmission therebetween when the latter is at rest; i. e., when the mower is stationary, or when the mower is slowly moving in an uphill direction. When the mower is moving more rapidly, there is less downward pull on the shaft 32 by belt 29 and less pressure exerted between drive wheel 33 and wheel 34. If the mower is moving forwardly at its top speed; i. e., with practically no resistance to turning movement of the ground wheels 34 and 37, there will be no tendency for the drive wheels 33 and 36 to be pulled downwardly onto the ground wheels, for the direction of pull of the drive chain 29 is normal to the direction of reciprocatory movement of shaft 32 allowed by bearing blocks 38 and 46. The only force then applied to hold the drive wheels in engagement with the ground wheels will be that applied by the compression springs 43 and 44. The bias of these springs may be adjusted so as to be sufficiently great to prevent slippage between the drive wheels and the ground wheels. It can be seen that the pressure between the drive wheel 33 and wheel 34 is automatically varied as mower operates.

If it is desired to stop the forward movement of the mower, the handle 61 is lowered, causing the levers 47 and 53 to pivot the shaft 32 upwardly, thus disengaging the drive wheels from the ground engaging wheels. Or, if desired, the handle 61 may be raised to its uppermost position so that lever 53 will occupy the dotted line position 53″ of Fig. 3. In this case, the levers 47 and 53 will act as a second class lever, with the roller 48 acting as the fulcrum, so that the shaft 32 will again be moved upwardly, carrying the drive wheels 33 and 36 therewith, out of engagement with the ground engaging wheels.

The handle 61 may be adjusted as to the amount of upward or downward movement thereof necessary to disengage the drive wheels, in the following manner. The bolt 54 is moved within slot 56 of lever 47 and clamped at the position at which the desired upward movement of lever 53 will cause the shaft 32 to be raised sufficiently to disengage the drive wheel 33. The bolt 51 is then adjusted vertically so that when the lever 53 is lowered to the desired position, the shaft 32 will again be raised sufficiently to disengage the drive wheels. The levers 57 and 58 are simultaneously adjusted in the same manner. The handle 61 will have a relatively large amount of movement in its intermediate position without causing the drive to be disengaged from the ground wheels 34 and 37.

If it is desired to vary the height of the cut, the cutting reel 24 is raised or lowered by adjusting the slide member 64 with respect to the frame member 13. This adjustment will not appreciably affect the adjustments of the levers 47 and 53, since the height of the shaft 32 will not be appreciably varied from the frame member 12 as has been explained. The wheel 37 is vertically adjustable by similar means.

Figs. 6, 7 and 8 illustrate a modification of the invention, as applied to a lawn mower in which the ground engaging wheels are vertically adjustable with respect to the frame, and are not horizontally moved in such adjustment.

In this modification, as in the previously described modification, power is applied from shaft 122 to drive the cutter reel 124 continuously and sprocket 128 is power driven to rotate shaft 132 by means of chain 129 so that the drive wheel 133 may rotate the ground engaging wheel 134.

The cutter reel 124 may be vertically adjusted with respect to the ground in the following manner. The main wheel 134 is mounted on a stub shaft 135 fixed to slide member 164 which is vertically slidable between guide members 162 and 163 formed on the frame side 113. When the cutter reel is the desired distance from the ground, the bolts 168, extending through slot 169 in frame member 113, are tightened.

In this vertical adjustment, the drive shaft 132 moves vertically with respect to the top frame member 112 an amount equal to the movement of the ground engaging wheel stub shaft 135 with respect to the frame. In order that a constant spring force be applied to hold the drive wheel 133 in normal contact with the ground engaging wheel 134, a tension spring 143 is attached between the drive shaft 132 and the stub shaft 135. In this manner, the spring tension remains constant despite vertical adjustment of the mower.

Similar means are employed in this embodiment to disengage the drive wheel 133 from the main wheel 134. A lever 147, having a roller 148 on its lower end, is mounted on shaft 132 so that the shaft passes through an elongated slot 156 in the lever 147. The operating handle 153 is rotatably mounted on shaft 132 and is provided with a bolt 154 extending through slot 156. As before, if the handle 153 is moved upwardly, the lever action of the lever combination 147 and 153 will move the shaft 132 upwardly, with such movement being guided by the sliding engagement of bearing block 138 on vertical guides 139 and 141, so that the shaft 132 moves in a direction normal to the pulling force of chain 129. Similarly, downward movement of handle 153 will cause portion 149 thereof to engage the adjustment bolt 151 to again move the shaft 132 upwardly.

When the cutter reel is adjusted for the desired height of cut, the shaft 132 will be moved vertically with respect to frame 112, as above described. The amount of upward movement of handle 153 to disengage the drive may then be adjusted as desired by adjusting the distance from shaft 132 to the roller 148. The amount of downward movement of handle 153 to disengage the drive may be varied by adjusting the vertical height of the top of nut 151 from frame member 112. Again, it is seen that the upward and downward movements of handle 153 required to disengage the drive may be independently varied.

It is of course understood that the other ground engaging wheel (not shown) is adjusted in the same manner as has just been described. The further operation of this embodiment is the same as that which has previously been described.

Figs. 9 and 10 illustrate another modification of the invention, as applied to a lawn mower in which the ground engaging wheels are vertically adjustable relative to the frame, and are not horizontally moved in such adjustment.

In this modification, as in the last modification, power is applied by a drive chain to sprocket 231, to rotate shaft 232 so that the drive wheel 233 may rotate the ground engaging wheel 234.

The cutter reel may again be vertically adjusted relative to the ground in the following manner. The main wheel 234 is mounted on an axle member 235 fixed to slide member 264 which is vertically slidable between guide members 262 and 263 formed on the frame side 213. When the cutter reel is the desired distance from the ground, bolts 268, extending through slot 267 in frame member 213, are tightened.

In this vertical adjustment, the drive shaft 232 moves vertically with respect to the top frame member 212 an amount equal to the movement of the ground engaging wheel axle member 235 relative to the frame. Tension spring 243 exerts a constant spring force between the drive wheel 233 and the ground engaging wheel 234, as before.

To provide for disengagement of the drive wheel 233 from main wheel 234, a bracket member 270 is fixed by bolts 271 to a member 272 fixed to slide member 264. The bracket member 270 is slotted at 276 to allow the bracket member to be vertically adjusted relative to the slide member 264. With the slide member 264 and bracket member 270 adjusted to an operating position, the bracket member 270 may be considered as being a portion of the frame of the machine, being fixed relative thereto.

A handle member 253 is rotatably mounted intermediate its ends on shaft 232, with the lower end of the handle, or lever, 253 being adapted to engage the sloping top surface 277 of bracket 270 upon upward movement of the handle. This engagement will cause the drive shaft 232 to move upwardly, with such movement being guided by the sliding engagement of bearing block 238 on vertical guides 239 and 241, so that the drive wheel 233 is disengaged from the main wheel 234. Continued rotation of the handle 253, past a vertical position, will put the handle in a storage position, with the handle being stopped by the engagement thereof with shoulder 278 on the bracket 270. In this position the lower end of handle 253 will be in engagement with the lowermost portion of the sloping surface 277, allowing the spring 243 to pull the drive wheel 233 back into engagement with ground wheel 234 so that the spring 243 is not subjected to undue tension during storage periods.

Rotation of the handle in the opposite direction, or downwardly, causes it to engage bolt member 251 adjustably mounted on bracket 270, enabling the shaft 232 to be pried upwardly, carrying the drive wheel 233 out of engagement with the main wheel 234.

Again, it is seen that the upward and downward rotation of the handle member 253 to disengage the drive wheel 233 may be independently adjusted.

With this modification, the vertical adjustment of the ground wheel 234 relative to the frame does not affect the drive disengaging adjustment of the handle 253, since the bracket 270 moves in unison with the ground wheel 234, drive wheel 233 and shaft 232. This enables the length of the handle 253 from the lower end thereof to the shaft 232 to be made relatively short so that maximum leverage can be applied by the rotation of the handle to disengage the drive wheel.

It is, of course, understood that the other ground engaging wheel (not shown) is adjusted in the same manner as has just been described. The further operation of this embodiment is the same as that described in connection with the first embodiment.

It is to be understood that the forms of the invention herewith shown and described are to be taken as preferred examples of the same, and that various changes in the shape, size and arrangement of parts may be resorted to without departing from the spirit of the invention or the scope of the attached claims.

Having thus described my invention, what I claim and desire to secure by Letters Patent is:

1. In a lawn mower having a frame and a ground engaging wheel freely rotatably mounted thereon; a power driven shaft rotatably mounted on said frame; a drive wheel mounted on said drive shaft in tangential and frictional engagement with said ground engaging wheel; spring means biasing said shaft and drive wheel towards said ground engaging wheel; a manually operable handle freely mounted on said shaft and movable between upper, intermediate and lower positions with respect to said frame; means actuated by said handle to move said shaft and drive wheel away from said ground engaging wheel when said handle is in its upper position; and means actuated by said handle to move said shaft and drive wheel away from said ground engaging wheel when said handle is in its lower position.

2. In a lawn mower having a frame and a ground engaging wheel mounted for free rotation thereon; a power driven shaft rotatably mounted on said frame; a drive wheel mounted on said drive shaft in tangential and frictional engagement with said ground engaging wheel; spring means biasing said shaft and drive wheel towards said ground engaging wheel; and a lever freely mounted intermediate its ends on said shaft and having a manually operable end movable between upper, intermediate and lower positions, the other end of said lever engaging said frame when said manually operable end is moved to its upper position to move said shaft away from said frame, said lever having a portion intermediate said shaft and said manually operable end engaging said frame when said manually operable end is moved to its lower position to move said shaft away from said frame.

3. In a lawn mower having a frame and a ground engaging wheel mounted thereon; a power driven shaft rotatably mounted on said frame; a drive wheel mounted on said drive shaft in tangential and frictional engagement with said ground engaging wheel; spring means biasing said shaft and drive wheel towards said ground engaging wheel; a first lever mounted intermediate its ends freely on said shaft and having one end thereof adapted to engage said frame upon rotative movement of said lever to move said shaft away from said frame; a vertically adjustable stop member mounted on said frame, said stop member being adapted to engage said lever upon opposite rotative movement thereof to move said shaft away from said frame; a second lever freely mounted on said shaft; and means to secure said first and second levers together at a desired angular relation therebetween.

4. In a lawn mower having a frame; a ground engaging wheel mounted on said frame; a drive shaft rotatably mounted on said frame parallel to the axis of said ground engaging wheel; a drive wheel mounted on said shaft in tangential frictional engagement with said ground engaging wheel; a drive belt around said shaft; power means to drive said drive belt to rotate said shaft and to urge said drive wheel towards said ground engaging wheel; spring means biasing said drive wheel towards said ground engaging wheel; and a lever freely mounted intermediate its ends on said shaft and having a manually operable end movable between upper, intermediate and lower positions, the other end of said lever engaging said frame when said manually operable end is moved to its upper position to move said drive wheel away from said ground engaging wheel, said lever having a portion intermediate said shaft and said manually operable end engaging said frame when said manually operable end is moved to its lower position to move said drive wheel away from said ground engaging wheel.

5. In a lawn mower having a frame; a ground engaging wheel mounted on said frame; a drive shaft rotatably mounted on said frame parallel to the axis of said ground engaging wheel and reciprocably movable towards and away from said ground engaging wheel; a drive wheel mounted on said shaft in tangential frictional engagement with said ground engaging wheel; a drive belt around said shaft; power means to drive said drive belt in a direction normal to the reciprocable movement of said shaft to rotate said shaft and to urge said drive wheel towards said ground engaging wheel; spring means biasing said drive wheel towards said ground engaging wheel; a manually operable handle freely mounted on said shaft and movable between upper, intermediate and lower positions with respect to said frame; means actuated by said handle to move said shaft and drive wheel against said bias away from said ground engaging wheel when said handle is in its upper position; means actuated by said handle to move said shaft and drive wheel against said bias away from said ground engaging wheel when said handle is in its lower position; and means to mount said ground engaging wheel at desired vertical points on said frame while maintaining a constant spring bias urging said drive wheel towards said ground engaging wheel.

6. In a lawn mower having a frame; a ground engaging wheel mounted on said frame; a drive shaft rotatably mounted on said frame parallel to the axis of said ground engaging wheel and reciprocably movable towards and away from said ground engaging wheel; a drive wheel mounted on said shaft in tangential frictional engagement with said ground engaging wheel; a drive belt around said shaft; power means to drive said drive belt in a direction normal to the reciprocable movement of said shaft to rotate said shaft and to urge said drive wheel towards said ground engaging wheel; spring means biasing said drive wheel towards said ground engaging wheel; a manually operable handle freely mounted on said shaft and movable between upper, intermediate and lower positions with respect to said frame; means actuated by said handle to move said shaft and drive wheel against said bias away from said ground engaging wheel when said handle is in its upper position; means actuated by said handle to move said shaft and drive wheel against said bias away from said ground engaging wheel when said handle is in its lower position; and means to mount said ground engaging wheel at desired vertical points on said frame, said points lying on a line approximately normal to the line between said axis and said shaft.

7. In a lawn mower having a frame; a ground engaging wheel mounted on said frame; a drive shaft rotatably mounted on said frame parallel to the axis of said ground engaging wheel and reciprocably movable towards and away from said ground engaging wheel; a drive wheel mounted on said shaft in tangential frictional engagement with said ground engaging wheel; a drive belt around said shaft; power means to drive said drive belt in a direction normal to the reciprocable movement of said shaft to rotate said shaft and to urge said drive wheel towards said ground engaging wheel; spring means biasing said drive wheel towards said ground engaging wheel; a manually operable handle freely mounted on said shaft and movable between upper, intermediate and lower positions with respect to said frame; means actuated by said handle to move said shaft and drive wheel against said bias away from said ground engaging wheel when said handle is in its upper position; means actuated by said handle to move said shaft and drive wheel against said bias away from said ground engaging wheel when said handle is in its lower position; and means to mount said ground engaging wheel at desired vertical points on said frame, said points being in line with the direction of reciprocable movement of said drive shaft.

8. In a lawn mower having a frame and a ground engaging wheel mounted thereon; a power driven shaft rotatably mounted on said frame; a drive wheel mounted on said drive shaft in tangential and frictional engagement with the top of said ground engaging wheel; spring means biasing said shaft and drive wheel towards said ground engaging wheel; means to adjust the vertical position of said ground engaging wheel relative to said frame; a lever mounted intermediate its ends freely on said drive shaft and having one end thereof adapted to engage said frame upon rotative movement of said lever to move said shaft away from said frame, said one end being adjustable as to its length from said drive shaft; and a vertically adjustable stop member mounted on said frame and adapted to engage a portion of said lever upon opposite rotative movement thereof to move said shaft away from said frame.

9. In a lawn mower having a frame and a ground engaging wheel mounted thereon; a power driven shaft rotatably mounted on said frame; a drive wheel mounted on said drive shaft in tangential and frictional engagement with the top of said ground engaging wheel; spring means biasing said shaft and drive wheel towards said ground engaging wheel; means to adjust the vertical position of said ground engaging wheel relative to said frame; a bracket mounted on said frame for vertical movement relative thereto with vertical movement of said ground engaging wheel; a lever mounted intermediate its ends freely on said drive shaft and having one end thereof adapted to engage said bracket upon rotative movement of said lever to move said shaft away from said frame; and a vertically adjustable stop member mounted on said bracket and adapted to engage a portion of said lever upon opposite rotative movement thereof to move said shaft away from said frame.

10. A lawn mower comprising: a frame; an axle member mounted on said frame; a ground engaging wheel rotatably mounted on said axle member; a power driven shaft rotatably mounted on said frame; a drive wheel mounted on said shaft in tangential frictional engagement with said ground engaging wheel; spring means biasing said drive wheel against said ground engaging wheel; a bracket member mounted on said axle member, means to adjust the vertical position of said axle member relative to said frame; a lever freely mounted intermediate its ends on said drive shaft and having one end thereof adapted to engage said bracket upon rotative movement of said lever to move said shaft away from said frame; and a vertically adjustable stop member mounted on said bracket and adapted to engage a portion of said lever upon opposite rotative movement thereof to move said shaft away from said frame.

References Cited in the file of this patent

UNITED STATES PATENTS

| | | |
|---|---|---|
| 1,819,791 | Reed | Aug. 18, 1931 |
| 2,328,233 | Schunk | Aug. 31, 1943 |
| 2,522,112 | Gilmour | Sept. 12, 1950 |
| 2,623,603 | Cutlan et al. | Dec. 30, 1052 |
| 2,809,705 | Sewell | Oct. 15, 1957 |